United States Patent [19]
Ichikawa

[11] Patent Number: 5,980,624
[45] Date of Patent: Nov. 9, 1999

[54] OIL BASE INK COMPOSITION

[75] Inventor: Shuji Ichikawa, Yokohama, Japan

[73] Assignee: Mitsubishi Pencil Kabushiki Kaisha, Tokyo, Japan

[21] Appl. No.: 08/927,026

[22] Filed: Sep. 10, 1997

[30] Foreign Application Priority Data

Oct. 17, 1996 [JP] Japan ..................... 8-274883

[51] Int. Cl.$^6$ .................................. C09D 11/00
[52] U.S. Cl. ................... 106/31.58; 106/31.86; 106/31.67
[58] Field of Search ............. 106/31.67, 31.86, 106/31.58

[56] References Cited

U.S. PATENT DOCUMENTS

| | | | |
|---|---|---|---|
| 4,525,216 | 6/1985 | Nakanishi | 106/31.67 |
| 4,604,139 | 8/1986 | Shioi et al. | 106/31.86 |
| 5,750,592 | 5/1998 | Shinozuka et al. | 523/161 |

*Primary Examiner*—Deborah Jones
*Assistant Examiner*—Veronica F. Faison
*Attorney, Agent, or Firm*—Darby & Darby

[57] ABSTRACT

Provided is an oil base ink composition usable for a stamp ink which has an excellent drying property of the print seal put on a hard-absorbing seal face and a performance for distinctly sealing and in which a sealing performance thereof is not reduced even after leaving the stamp ink pad with a cover opened for a long time, and a marking ink which does not bring about impossibility of writing caused by dry up at the pen tip as well as an ink for a ball point pen and an ink for ink jet which have a good drying property and do not provide the problem of blurring on the ink-adhered face. The above oil base ink composition contains at least one solvent selected from the group consisting of alcohols, ethers and esters each having a vapor pressure of 0.005 to 45 mmHg at 20° C. and a dispersion term $\delta_d$ of 13.0 to 20.0, a polar term $\delta_p$ of 1.0 to 10.0 and a hydrogen bond term $\delta_h$ of 5.0 to 20.0 in a Hansen three dimensional dissolution parameter, a solvent evaporation-inhibiting additive containing an ester derivative of polyhydric alcohol, at least one additive selected from the group consisting of a resin which is soluble in said solvent and a surfactant, and a colorant.

6 Claims, No Drawings

OIL BASE INK COMPOSITION

BACKGROUND OF THE INVENTION

(1) Field of the Invention

The present invention relates to an oil base ink composition which is suitably used for recording inks such as a stamp ink and an ink jet ink and inks for writing tools such as an ink for a ball point pen and an ink for a marking pen.

(2) Description of the Prior Art

Inks for writing tools and recording inks have so far been divided roughly into water base inks and oil base inks.

In the case of, for example, an ink used for a stamp pad, a water base ink penetrates primarily through a paper surface and is dried and fixed thereon. Accordingly, the ink has a low penetrating rate and a very inferior drying property to hard-absorbing faces of art paper and coated paper. Further, in the case where a water base ink sticks on a rubber seal face in a large amount, because of the poor wettability of the ink on a rubber seal face, the drying property is inferior, and the print seal tends to be blurred. In contrast with this, if the amount of the ink adhered on a rubber seal face is controlled to a small amount, the adhesion thereof becomes thin, and the print seal in stamping becomes stained. Further, since a water base ink uses a water soluble dye, it has the defect that it has a poor water resistance.

On the other hand, oil base inks for a stamp include two kinds of a type using a scarcely volatile solvent and a type using a highly volatile solvent, and both have a very good water resistance. However, while the former type has the advantage that because of a scarce volatility thereof, the stamp pad does not have to remain always in a closed state, it has the defect that the print seal put on non-absorbing faces of art paper and coated paper has a low drying property since the ink is adhered on a paper surface primarily by penetrating-drying as is the case with a water base ink. On the other hand, the latter type has the advantage that the print seal put on a non-absorbing face has a high drying property since the ink is adhered on a paper surface primarily by evaporating-drying. However, since the ink contains the highly volatile solvent, the amount of the ink adhered on a rubber seal face is obliged to be increased in order to prevent drying, and as a result thereof, excess adhered amount of the ink causes the print seal to lack in sharpness. In addition thereto, it has the defect that because of a high volatility of the ink, leaving the cover of the stamp ink pad in an open state for a while makes the surface thereof dry to extremely lower the adhered amount of the ink, which results in the blurred print seal or impossibility of sealing.

In the case of an ink for a marking pen, an oil base ink is used as an ink capable of writing on both absorbing faces of paper and cloth and non-absorbing faces of plastic, glass and metal. On the other hand, however, it has the problems that leaving the pen with a cap taken off causes the ink to be dried and solidified to precipitate the ink component at the pen tip and lower the ink feeding amount and therefore prevents the ink from flowing out of the pen tip, which result in blurring the drawn lines or causing impossibility of writing due to dry-up at the pen tip.

Other inks for ball point pens and inks for ink jet have the same problems.

SUMMARY OF THE INVENTION

As described above, the present invention is intended to solve conventional problems regarding the drying property of an oil base ink used for an ink for a writing tool and a recording ink and blur on an ink-adhered face.

In the case of an ink for a stamp, an object of the present invention is to provide an oil base ink composition which has a good drying property and a sharp sealing performance of a print seal obtained by stamping, a property to control drying of the surface of the stamp ink pad and an excellent drying property on hard ink-absorbing faces of art paper and coated paper and which provides a distinct print seal on a thin paper face having rough fibrous quality such as tracing paper and does not damage a sealing performance even after leaving the cover of the stamp ink pad in an open state for a long time.

In the case of an marking ink, an object of the present invention is to provide an oil base ink composition which does not cause impossibility of writing due to dry-up at the pen tip.

Also in the case of inks for a ball point pen and an ink for ink jet, an objet of the present invention is to provide an oil base ink composition which does not cause impossibility of recording.

Intensive investigations made by the present inventors in order to solve the problems described above have resulted in finding that the problems described above can be solved by using a solvent in which a vapor pressure and Hansen three dimensional dissolution parameter are limited and an ester derivative of polyhydric alcohol as an additive for providing a evaporation inhibiting effect, and thus coming to complete the oil base ink composition of the present invention.

According to one aspect of the present invention, provided is an oil base ink composition comprising at least one solvent selected from the group consisting of alcohols, ethers and esters each having a vapor pressure of 0.005 to 45 mmHg at 20° C. and a dispersion term $\delta_d$ of 13.0 to 20.0, a polar term $\delta_p$ of 1.0 to 10.0 and a p hydrogen bond term $\delta_h$ of 5.0 to 20.0 in a Hansen three dimensional dissolution parameter; a solvent evaporation-inhibiting additive containing an ester derivative of polyhydric alcohol; at least one additive selected from the group consisting of a resin which is soluble in the solvent described above and a surfactant; and a colorant.

The ester derivative of polyhydric alcohol has an HLB falling preferably in a range of 2.0 to 16.0. Further, the ester derivative of polyhydric alcohol is preferably at least one selected from polyglycerin higher fatty acid esters.

Preferably, the solvent described above has a content of 20 to 95% by weight; the solvent evaporation-inhibiting additive described above has a content of 0.001 to 10% by weight; the additive described above has a content of 0.001 to 30% by weight; and the colorant described above has a content of 1 to 50% by weight each based on the whole amount of the composition.

The ink for a stamp, the ink for a writing tool and the ink for ink jet according to the present invention contain the oil base ink composition described above.

The stamp ink pad according to the present invention is charged with the oil base ink composition described above.

The pen for a writing tool according to the present invention is charged with the oil base ink composition described above.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

The solvent used for the oil base ink composition of the present invention is at least one solvent selected from the group consisting of alcohols, ethers and esters each having a vapor pressure of 0.005 to 45 mmHg at 20° C. and a dispersion term $\delta_d$ of 13.0 to 20.0, a polar term $\delta_p$ of 1.0 to 10.0 and a hydrogen bond term $\delta_h$ of 5.0 to 20.0 in the Hansen three dimensional dissolution parameter.

The alcohols include, for example, alcohols having two or more carbons in a molecule, such as ethanol, 1-propanol, 2-propanol, 1-butanol and 2-butanol, and polyhydric alcohols having two or more carbons and two or more hydroxyl groups in a molecule, such as ethylene glycol, diethylene glycol, 3-methyl-1,3-butanediol, triethylene glycol, dipropylene glycol, 1,3-propanediol, 1,3-butanediol, 1,5-pentanediol, hexylene glycol and octylene glycol.

The ethers include, for example, dialkyl ethers such as methyl isopropyl ether, diethyl ether, ethyl propyl ether, ethyl butyl ether, 2-ethylhexyl ether, diisopropyl ether, dibutyl ether and dihexyl ether, and glycol ethers such as ethylene glycol monomethyl ether, ethylene glycol monoethyl ether, ethylene glycol monobutyl ether, ethylene glycol monohexyl ether, ethylene glycol monophenyl ether, ethylene glycol mono-2-ethylbutyl ether, ethylene glycol dibutyl ether, diethylene glycol monomethyl ether, diethylene glycol monoethyl ether, diethylene glycol monobutyl ether, diethylene glycol diethyl ether, diethylene glycol dibutyl ether, propylene glycol methyl ether, dipropylene glycol methyl ether, tripropylene glycol methyl ether, propylene glycol ethyl ether, propylene glycol butyl ether, dipropylene glycol n-butyl ether, tripropylene glycol n-butyl ether, propylene glycol tertiary-butyl ether, propylene glycol phenyl ether and 3-methyl-3-methoxy-1-butanol.

The esters include, for example, fatty acid esters such as methyl formate, ethyl formate, propyl formate, isobutyl formate, isoamyl formate, methyl acetate, ethyl acetate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate and propyl isobutyrate, and glycol esters such as propylene glycol methyl ether acetate, propylene glycol diacetate, 3-methyl-3-methoxybutyl acetate, propylene glycol ethyl ether acetate and ethylene glycol ethyl ether acetate.

These alcohols, polyhydric alcohols, ethers and esters may be used either alone or in combination of two or more kinds thereof.

The content of these solvents in the oil base ink composition of the present invention falls in a range of 20 to 95% by weight, preferably 30 to 90% by weight and more preferably 40 to 90% by weight based on the whole amount of the composition.

The solvent evaporation-inhibiting additive used for the oil base ink composition of the present invention contains the ester derivative of polyhydric alcohol without fail. The ester derivative of polyhydric alcohol has preferably an HLB value of 2.0 to 16.0. To be specific, the ester derivative includes higher fatty acid esters of polyhydric alcohols selected from the group consisting of polyglycerin higher fatty acid esters, sorbitan fatty acid esters, sucrose fatty acid esters and propylene glycol fatty acid esters. Polyglycerin higher fatty acid esters are preferred, and particularly when polyglycerin stearic acid ester is used, the solvent evaporation-inhibiting effect is displayed very well.

Other solvent evaporation-inhibiting additives than these products include acidic phosphoric acid higher alcohol esters or salts thereof, phosphorous acid higher alcohol esters, polyoxyethylene alkylamines and polyoxyethylene fatty acid amide. They have a small solvent evaporation-inhibiting effect and may be used in combination with the ester derivatives of polyhydric alcohols.

The ester derivative of polyhydric alcohol has the HLB falling in a range of 2.0 to 16.0, preferably 2.0 to 14.0 and more preferably 2.0 to 13.0, and in such range, the good solvent evaporation-inhibiting effect can be provided.

The solvent evaporation-inhibiting additives used in the present invention may be used either alone or in combination of two or more kinds thereof. The content thereof is 0.001 to 10% by weight, preferably 0.005 to 5% by weight and more preferably 0.01 to 5% by weight based on the whole amount of the composition.

The polyglycerin higher fatty acid esters include, for example, glyceryl monostearate, glyceryl monooleate, diglycerin monostearate, diglycerin monolaurate, diglycerin monopalmitate, diglycerin monooleate, diglycerin sesquioleate, diglycerin dioleate, diglycerin monoisopalmitate, diglycerin monoisostearate, diglycerin diisostearate, diglycerin triisostearate, triglycerin monolaurate, triglycerin monostearate, triglycerin monooleate, triglycerin monoisostearate, triglycerin diisostearate, tetraglycerin monocaprylate, tetraglycerin monolaurate, tetraglycerin monostearate, tetraglycerin tristearate, tetraglycerin pentastearate, tetraglycerin monooleate, tetraglycerin pentaoleate, tetraglycerin monoisostearate, pentaglycerin monolaurate, pentaglycerin monooleate, pentaglycerin monoisostearate, hexaglycerin monomyristate, hexaglycerin monooleate, hexaglycerin dioleate, hexaglycerin pentaoleate, hexaglycerin monostearate, hexaglycerin hexastearate, hexaglycerin sesquistearate, hexaglycerin distearate, hexaglycerin tristearate, hexaglycerin pentastearate, hexaglycerin monocaprylate, hexaglycerin monolaurate, hexaglycerin monoisostearate, octaglycerin monostearate, octaglycerin monooleate, decaglycerin monocaprylate, decaglycerin monomyristate, decaglycerin monooleate, decaglycerin dioleate, decaglycerin trioleate, decaglycerin tetraoleate, decaglycerin pentaoleate, decaglycerin hexaoleate, decaglycerin heptaoleate, decaglycerin octaoleate, decaglycerin decaoleate, decaglycerin monostearate, decaglycerin distearate, decaglycerin tristearate, decaglycerin pentastearate, decaglycerin heptastearate, decaglycerin octastearate, decaglycerin decastearate, decaglycerin monolaurate, decaglycerin monopalmitate, decaglycerin heptabehenate, decaglycerin monolinoleate, and decaglycerin diisostearate. In particular, polyglycerin stearic acid ester is preferred.

The sorbitan fatty acid esters include, for example, sorbitan monostearate, sorbitan distearate, sorbitan tristearate, sorbitan monooleate, sorbitan dioleate, sorbitan trioleate, sorbitan monolaurate, sorbitan monopalmitate, sorbitan sesquistearate, sorbitan sesquioleate, sorbitan mono-tall oil fatty acid ester, sorbitan sesqui-tall oil fatty acid ester, and sorbitan monoisostearate.

The typical sucrose fatty acid esters include, for example, sucrose lauric acid ester, sucrose myristic acid ester, sucrose palmitic acid ester and sucrose oleic acid ester.

The propylene glycol fatty acid esters include, for example, propylene glycol monolaurate, propylene glycol monomyristate, propylene glycol monooleate, propylene glycol monostearate, propylene glycol dilaurate, propylene glycol dimyristate and propylene glycol distearate.

The colorants used for the oil base ink composition are classified primarily into dyes and pigments. The dyes shall not specifically be restricted as long as they are dissolved in the solvents described previously in an amount of 3.0% by weight or more. They include dyes used for conventional dye ink compositions, for example, direct dyes, basic dyes, mordant-acidic mordant dyes, azoic dyes, sulfur-sulfur vat dyes, vat dyes, disperse dyes, oil dyes, food dyes and metal complex dyes.

The pigments can optionally be used selecting from among inorganic and organic pigments used for conventional pigment ink compositions.

The content of the colorant contained in the oil base ink composition of the present invention falls in a range of 1 to 50% by weight, preferably 2 to 40% by weight and more preferably 2 to 35% by weight based on the whole amount of the composition. In the case of the dyes, the content thereof falls preferably in a range of 2 to 25% by weight, and in the case of the pigments, the content thereof falls preferably in a range of 5 to 35% by weight.

The additive used for the composition of the present invention is at least one selected from the group consisting of a resin and a surfactant. The above resin may be any one as long as it is dissolved in the solvents described above in an amount of 3.0% by weight or more and includes, for example, natural resins such as glue, gum arabic and rosin, semi-synthetic resins such as hydroxyethyl cellulose and derivatives thereof and rosin derivatives, and synthetic resins such as polyvinyl alcohol, polyvinylpyrrolidone, polyvinylbutyral, polyvinyl ether, styrene-maleic acid copolymers, ketone resins and styrene-acrylic acid copolymers.

These resins may be used in combination of two or more kinds thereof. The content thereof falls in a range of 0.001 to 30% by weight, preferably 1.0 to 20% by weight and more preferably 1.5 to 18% by weight based on the whole amount of the composition.

These resins show the effects of strengthening the fastness of the print seal and controlling the viscosity of the stamp ink, and when the pigments are used as the colorant, the resins are used for the purpose of a dispersant for the pigments in a certain case.

When the pigments are used as the colorant for the oil base ink composition of the present invention, dispersants are required and include synthetic resins dissolved in the solvents used in an amount 3.0% by weight or more and surfactants such as an anionic surfactant, a cationic surfactant and an amphoteric surfactant. Out of them, there can be given as the very effective dispersants, polyvinyl alcohol, polyvinylpyrrolidone, polyvinylbutyral, polyvinyl ether, styrene-maleic acid copolymers, ketone group resins and styrene-acrylic acid copolymers which have been described above as the resin.

The content of the surfactant contained in the oil base ink composition of the present invention falls in a range of 0.001 to 30% by weight, preferably 0.01 to 25% by weight and more preferably 0.05 to 20% by weight based on the whole amount of the composition.

When the pigments are used, a method for dispersing them includes, for example, a method using a ball mill, a sand mill, a roll mill, a homo mixer, a stirrer or a supersonic wave.

The surfactants used for the oil base ink composition of the present invention include nonionic surfactants such as polyoxyalkylene higher fatty acid esters, higher fatty acid partial esters of polyhydric alcohols and higher fatty acid esters of sucrose. Specifically, they include fatty acid esters of glycerin, polyglycerin fatty acid esters, polypropylene glycol fatty acid esters, pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene fitosterol, polyoxyethylene polyoxypropylene alkyl ethers, polyoxyethylene alkylphenyl ethers, polyoxyethylene castor oil, polyoxyethylene lanolin, polyoxyethylene lanolin alcohol, polyoxyethylene alkylamines, polyoxyethylene fatty amides, and polyoxyethylene alkylphenylformaldehyde condensation products.

The anionic surfactants include alkylated sulfonic acid salts of higher fatty amides and alkylallylsulfonic acid salts. Specifically, they include alkylsulfate, polyoxyethylene alkyl ether sulfates, N-acylamino acid salts, N-acylmethyltaurine salts, polyoxyethylene alkyl ether acetates, alkylphosphates, and polyoxyethylene alkyl ether phosphates. The surfactants are used not only as the dispersants for the pigments but also as the agents for accelerating penetration on a paper surface, inhibiting blur of the print seal and controlling the surface tension.

The oil base ink composition of the present invention can be blended with usually used additives as well as preservatives, anti-corrosives, lubricants, anti-static agents and defoaming agents, if necessary.

When the oil base ink composition of the present invention is used for a stamp ink, the print seal has a good drying property even in sealing on hard ink-absorbing faces of art paper and coated paper; the distinct print seal is given as well in sealing on a thin paper face having rough fibrous quality such as tracing paper; and even after leaving the cover of the stamp ink pad in an open state for a long time, the ink adhesion onto a print face does not change and the sealing performance is not damaged.

Further, when the composition is used for a marking ink, leaving the pen with a cap taken off does not causes such phenomenon that the ink component is deposited at the pen tip, and therefore the writing performance is good, so that such conventional problems that the drawn lines are blurred to cause impossibility of writing are not brought about.

Further, print seals, drawn lines and records by sealing, writing and printing with stamp ink pads, pens for writing tools and ink jet each using inks containing the oil base ink compositions of the present invention are durable and have a good water resistance.

The following are considered as the reasons why the oil base ink composition of the present invention displays the effects described above.

In the case of, for example, an ink for a stamp, the solvent has a relatively high penetrability against a sealing face and a high vapor pressure as compared with those of solvents used for conventional inks, and therefore when the ink is adhered on the sealing face, two paths can be taken; one is adhesion by drying after penetration, and the other is adhesion by evaporation and drying. Accordingly, the drying property against the hard-absorbing faces of art paper and coated paper is improved very much as well.

Further, because of the good wettability on a rubber seal face and the solvent evaporation-inhibiting effect of the ester derivatives of polyhydric alcohols, the ink does not have to be adhered on a rubber seal face in large quantities when it is used for a stamp ink, and controlling the amount of the ink adhered on the rubber seal face does not cause thin adhesion of the ink. As a result thereof, the print seal is neither blotted by the excess ink nor blurred by the controlled ink amount, and therefore the print seal obtained by sealing becomes distinct. Further, leaving the cover of the stamp ink pad in an open state for a while does not make the surface thereof dry to extremely reduce the outflow of the ink. Accordingly, neither the print seal is blurred nor sealing becomes impossible.

In the case of a marking ink, because of less drying which follows the volatilization of a solvent, the ink is not solidified, and therefore such phenomenon that the ink component is deposited at the pen tip does not take place.

Further, since water soluble materials are not contained, the print seals, drawn lines and records obtained by sealing, writing and printing are durable and have a good water resistance.

The Hansen three dimensional dissolution parameter in the present invention shows the following content.

First, the dissolution parameter is shown as a scale for a mixing property between the respective components in mixing and dissolving them, and the dissolution is expressed as follows:

Based on the assumption that when two components, a component I and a component II are dissolved, the bonds of I—I and II—II are changed to I—II between the respective molecules, the heat balance thereof is considered, wherein it means vaporization thereof to release the respective molecules from an inter-molecular force surrounding them, and therefore a change in an internal energy in mixing the vaporized components and condensing them as they are is shown by the following equation:

$$\Delta E = \Delta E_1 + \Delta E_2 - 2(\Delta E_1 \cdot \Delta E_2)^{0.5}$$
$$\Delta E = [(\Delta E_1)^{0.5} - (\Delta E_2)^{0.5}]^2$$

[$\Delta E_1$: internal energy change when vaporizing the component I $\Delta E_2$: internal energy change when vaporizing the component II $(\Delta E_1 \cdot \Delta E_2)^{0.5}$: bond energy produced between the components I and II, which is a recoverable energy]

That is, the smaller the $(\Delta E_1)-(\Delta E_2)^{0.5}$ is, the smaller the enthalpy change $\Delta H$ is, and the more the dissolution is facilitated. $\Delta E$ per unit volume of each component, which is called a condensing energy, has a relation of $\Delta H = \Delta E + RT$ with an enthalpy $\Delta H_v$ in vaporization, and therefore $\Delta H$ is determined from a temperature dependence of a vapor pressure according to the Clausius-Clapeyron, whereby $\Delta E$ can be known.

Here, a square root of a condensing energy density is called a dissolution parameter and shown by the following equation:

$$\delta = (\Delta E/V)^{0.5}$$

[$\Delta E$: molecular condensing energy (cal/mol),

V: molecular volume (ml/mol)]

Various methods for determining it are available, and a little different values are obtained depending on the determining methods and the calculating methods. Known as the specific examples thereof are a latent vaporization heat method (Hildebrand method), a vapor pressure method (Hoy method), a dissolution method, a swelling method, a surface tension method, a critical pressure method, a thermal expansion coefficient method and a molecular attracting force constant method.

The three dimensional dissolution parameter used here is tried to be quantified by dividing the dissolution state of a substance to be dissolved into the contribution factors of a dispersion force (London force), an inter-dipole force (Keesom force) and a hydrogen bond force in an inter-molecular force regarding $\Delta E$ shown in the above equation. Among them, the typical one is the Hansen three dimensional dissolution parameter.

In this three dimensional dissolution parameter, $\Delta E$ is shown as the sum of the following three components:

$$\Delta E = \Delta E_d + \Delta E_p + \Delta E_h$$

[$\Delta E_d$, $\Delta E_p$ and $\Delta E_h$ show a dispersion force, a polar effect and a hydrogen bond effect, respectively]

$\delta$ is divided as well into three components and shown by the following equation:

$$\delta^2 = \delta_d^2 + \delta_p^2 + \delta_h^2$$

$\delta$ is divided as shown in the above equation by the following method:

$\delta_d$: $\delta$ of a compound (hydrocarbon) which is similar to an intended molecule in terms of a size and a structure and in which an inter-molecular force thereof other than a dispersion force can be neglected.

$\delta_h$: hydrogen bond between alcoholic OH and hydrogen has an energy of $5 \times 10^3$ cal/mol, and therefore $\delta_h$ is $(5000 \, A/V_m)^{1/2}$ as far as alcohol is concerned.

A: number of a hydroxyl group in a molecule.

$V_m$: molecular volume $\delta_p$: determined from $\delta$ determined previously and $\delta_d$ and $\delta_h$ obtained above and obtained as well from a dipole moment and a dielectric constant.

Here, "cal/mol" is used for a unit of energy but the Hansen three dimensional dissolution parameter uses "J/mol" for a unit of energy, and therefore the unit is expressed by $(J/cm^3)^{1/2}$.

In the present invention, HLB shows the following content.

HLB was proposed by Griffin in light of a balance of strength between a hydrophilic group and a lipophilic group which constitute a surfactant and named HLB from Hydrophile-Lipophile Balance.

Griffin proposed an equation for calculating the HLB of a nonionic surfactant and showed that of polyhydric alcohol fatty acid ester by the following equation:

$$HLB = 20(1 - S/A)$$

wherein A represents a neutralization value, and S represents a saponification value of ester. The HLB of esters in which saponification values are difficult to determine is shown by the following equation:

$$HLB = (E + P)/5$$

wherein E represents weight % of ethylene oxide, and P represents weight % of polyhydric alcohol.

The HLB of an ethylene oxide derivative of monohydric alcohol is shown by the following equation:

$$HLB = E/5$$

In addition to the HLBs determined in the manners described above, included are Kawakami type HLB proposed by Kawakami, HLF (Hydrophile-Lipophile Factor) published by Moore and Bell and HLB of a type in which numerals are set to a hydrophilic group and a lipophilic group to determine a cardinal number, proposed by Davies. An organic concept drawing published by Fujita is a value obtained by considering a balance between hydrophilicity and lipophilicity.

These values are different according to the methods and can be applied to the values of HLB shown in the claims. The HLB of Griffin shall be used here as a typical value.

EXAMPLES

The present invention shall specifically be explained below with reference to examples but the present invention shall not be restricted by these examples. In the examples, % shows % by weight, and the vapor pressures of solvents are values at 20° C.

A $\delta_d$ value, a $\delta_p$ value and a $\delta_h$ value show a dispersion term, a polar term and a hydrogen bond term respectively in the Hansen three dimensional dissolution parameter.

Example 1

| | |
|---|---|
| Colorant: oil soluble dye (Bali First Black #3820 manufactured by Orient Chemical Ind. Co., Ltd.) | 8% |
| Resin: Ketone Rein K90 manufactured by Arakawa Chemical Ind. Co., Ltd. | 5% |
| Solvent: dipropylene glycol monomethyl ether (vapor pressure: 0.45 mmHg, $\delta_d$ value: 15.5, $\delta_p$ value: 4.0, $\delta_h$ value: 11.5) | 55% |
| propylene glycol monobutyl ether (vapor pressure: 0.60 mmHg, $\delta_d$ value: 14.9, $\delta_p$ value: 2.4, $\delta_h$ value: 10.7) | 30% |
| Ester derivative of polyhydric alcohol: diglycerin monostearate (HLB = 6.5) | 2% |

An oil base ink composition was obtained by compounding as described above.

The oil base ink composition thus obtained was intended for a stamp ink and charged into a felt for a stamp to prepare a stamp ink pad.

Example 2

| | |
|---|---|
| Colorant: oil soluble dye (same as in Example 1) | 8% |
| Resin: polyvinylbutyral (BL-1 manufactured by Sekisui Chemical Ind. Co., Ltd. | 5% |
| Solvent: propylene glycol monobutyl ether (vapor pressure: 0.60 mmHg, $\delta_d$ value: 14.9, $\delta_p$ value: 2.4, $\delta_h$ value: 10.7) | 20% |
| dipropylene glycol monomethyl ether (vapor pressure: 0.45 mmHg, $\delta_d$ value: 15.5, $\delta_p$ value: 4.0, $\delta_h$ value: 11.5) | 52% |
| 3-methoxy-3-methyl-1-butanol (vapor pressure: 0.50 mmHg, $\delta_d$ value: 16.0, $\delta_p$ value: $\delta_h$ value: 12.3) | 10% |
| Ester derivative of polyhydric alcohol: propylene glycol monostearate (HLB = 3.5) | 2% |
| hexaglycerin hexastearate (HLB = 12.2) | 3% |

An oil base ink composition was obtained by compounding as described above.

The oil base ink composition thus obtained was intended for a stamp ink and charged into a felt for a stamp to prepare a stamp ink pad.

Example 3

| | |
|---|---|
| Colorant: oil soluble dye (same as in Example 1) | 8% |
| Resin: Ketone Resin (same as in Example 1) | 3% |
| Solvent: hexylene glycol (vapor pressure: 0.02 mmHg, $\delta_d$ value: 15.7, $\delta_p$ value: 8.4, $\delta_h$ value: 17.8) | 82% |
| Ester derivative of polyhydric alcohol: propylene glycol monostearate (HLB = 3.5) | 3% |
| hexaglycerin distearate (HLB = 8.6) | 2% |
| Surfactant: poly ether-modified silicon oil | 2% |

An oil base ink composition was obtained by compounding as described above.

The oil base ink composition thus obtained was intended for a stamp ink and charged into a felt for a stamp to prepare a stamp ink pad.

Example 4

| | |
|---|---|
| Colorant: oil soluble dye (Bali First Black #3830 manufactured by Orient Chemical Ind. Co., Ltd.) | 8% |
| Resin: polyvinylbutyral (same as in Example 2) | 5% |
| Solvent: diethylene glycol monobutyl ether (vapor pressure: 0.01 mmHg, $\delta_d$ value: 16.0, $\delta_p$ value: 7.0, $\delta_h$ value: 10.6) | 62% |
| 3-methoxy-3-methyl-1-butanol (vapor pressure: 0.50 mmHg, $\delta_d$ value: 16.0, $\delta_p$ value: 5.1, $\delta_h$ value: 12.3) | 22% |
| Ester derivative of polyhydric alcohol: diglycerin monostearate (HLB = 6.5) | 1.5% |
| hexaglycerin hexastearate (HLB = 12.2) | 1.5% |

An oil base ink composition was obtained by compounding as described above.

The oil base ink composition thus obtained was intended for a stamp ink and charged into a felt for a stamp to prepare a stamp ink pad.

Example 5

| | |
|---|---|
| Colorant: oil soluble dye (same as in Example 4) | 8% |
| Resin: polyvinylbutyral (same as in Example 2) | 5% |
| Solvent: dipropylene glycol monomethyl ether (vapor pressure: 0.45 mmHg, $\delta_d$ value: 15.5, $\delta_p$ value: 4.0, $\delta_h$ value: 11.5) | 51% |
| 3-methoxy-3-methyl-1-butanol (vapor pressure: 0.50 mmHg, $\delta_d$ value: 16.0, $\delta_p$ value: 5.1, $\delta_h$ value: 12.3) | 33% |
| Ester derivative of polyhydric alcohol: diglycerin monostearate (HLB = 6.5) | 1.5% |
| hexaglycerin hexastearate (HLB = 12.2) | 1.5% |

An oil base ink composition was obtained by compounding as described above.

The oil base ink composition thus obtained was intended for a stamp ink and charged into a felt for a stamp to prepare a stamp ink pad.

Example 6

| | |
|---|---|
| Colorant: oil soluble dye (same as in Example 4) | 8% |
| Resin: polyvinylbutyral (same as in Example 2) | 5% |
| Solvent: hexylene glycol (vapor pressure: 0.02 mmHg, $\delta_d$ value: 15.7, $\delta_p$ value: 8.4, $\delta_h$ value: 17.8) | 52% |
| diethylene glycol monobutyl ether (vapor pressure: 0.01 mmHg, $\delta_d$ value: 16.0, $\delta_p$ value: 7.0, $\delta_h$ value: 10.6) | 31% |
| Ester derivative of polyhydric alcohol: diglycerin monostearate (HLB = 6.5) | 1.5% |
| propylene glycol monostearate (HLB = 3.5) | 1% |
| Surfactant: poly ether-modified silicone oil | 1.5% |

An oil base ink composition was obtained by compounding as described above.

The oil base ink composition thus obtained was intended for a stamp ink and charged into a felt for a stamp to prepare a stamp ink pad.

Example 7

| | |
|---|---|
| Colorant: carbon black (#25 manufactured by Mitsubishi Chemicals Co., Ltd.) | 8% |
| Resin: polyvinylbutyral (same as in Example 2) | 5% |
| Solvent: hexylene glycol (vapor pressure: 0.02 mmHg, $\delta_d$ value: 15.7, $\delta_p$ value: 8.4, $\delta_h$ value: 17.8) | 62% |
| 3-methoxy-3-methyl-1-butanol (vapor pressure: 0.50 mmHg, $\delta_d$ value: 16.0, $\delta_p$ value: 5.1, $\delta_h$ value: 12.3) | 23% |
| Ester derivative of polyhydric alcohol: | |
| hexaglycerin distearate (HLB = 8.6) | 1.5% |
| decaglycerin pentastearate (HLB = 6.4) | 0.5% |

An oil base ink composition was obtained by compounding as described above.

The oil base ink composition thus obtained was intended for a stamp ink and charged into a felt for a stamp to prepare a stamp ink pad.

Comparative Example 1

| | |
|---|---|
| Colorant: water soluble dye (Water Black R-500 manufactured by Orient Chemical Ind. Co., Ltd.) | 8% |
| Resin: polyvinylpyrrolidone (K-30 manufactured by ISP. PET. LTD. | 5% |
| Solvent: water (vapor pressure: 17.5 mmHg, $\delta_d$ value: 19.5, $\delta_p$ value: 17.8, $\delta_h$ value: 17.6) | 30% |
| glycerin (vapor pressure: 0.01 mmHg, $\delta_d$ value: 17.4, $\delta_p$ value: 12.1, $\delta_h$ value: 29.3) | 50% |

An ink composition was obtained by compounding as described above.

The ink composition thus obtained was intended for a stamp ink and charged into a felt for a stamp to prepare a stamp ink pad.

Comparative Example 2

| | |
|---|---|
| Colorant: oil soluble dye (same as in Example 4) | 8% |
| Resin: Ketone Resin (same as in Example 1) | 5% |
| Solvent: tripropylene glycol methyl ether (vapor pressure: 0.02 mmHg, $\delta_d$ value: 15.1, $\delta_p$ value: 3.5, $\delta_h$ value: 11.5) | 20% |
| polypropylene glycol (molecular weight 1000) (vapor pressure: 0.001 mmHg or less, $\delta_d$, $\delta_p$ and $\delta_h$ values: unknown) | 67% |

An ink composition was obtained by compounding as described above.

The ink composition thus obtained was intended for a stamp ink and charged into a felt for a stamp to prepare a stamp ink pad.

Comparative Example 3

| | |
|---|---|
| Colorant: oil soluble dye (same as in Example 1) | 8% |
| Resin: Ketone Resin (same as in Example 1) | 3% |
| Solvent: methyl alcohol (vapor pressure: 100 mmHg, $\delta_d$ value: 15.1; $\delta_p$ value: 12.3, $\delta_h$ value: 22.3) | 89% |

An ink composition was obtained by compounding as described above.

The ink composition thus obtained was intended for a stamp ink and charged into a felt for a stamp to prepare a stamp ink pad.

Comparative Example 4

| | |
|---|---|
| Colorant: oil soluble dye (same as in Example 1) | 8% |
| Resin: polyvinylbutyral (same as in Example 2) | 5% |
| Solvent: propylene glycol monobutyl ether (vapor pressure: 0.60 mmHg, $\delta_d$ value: 14.9, $\delta_p$ value: 2.4, $\delta_h$ value: 10.7) | 35% |
| dipropylene glycol monomethyl ether (vapor pressure: 0.45 mmHg, $\delta_d$ value: 16.0, $\delta_p$ value: 7.0, $\delta_h$ value: 10.6) | 32% |
| 3-methoxy-3-methyl-1-butanol (vapor pressure: 0.50 mmHg, $\delta_d$ value: 16.0, $\delta_p$ value: 5.1, $\delta_h$ value: 12.3) | 20% |

An ink composition was obtained by compounding as described above.

The ink composition thus obtained was intended for a stamp ink and charged into a felt for a stamp to prepare a stamp ink pad.

Comparative Example 5

| | |
|---|---|
| Colorant: oil soluble dye (same as in Example 1) | 8% |
| Resin: polyvinylbutyral (same as in Example 2) | 5% |
| Solvent: propylene glycol monobutyl ether (vapor pressure: 0.60 mmHg, $\delta_d$ value: 14.9, $\delta_p$ value: 2.4, $\delta_h$ value: 10.7) | 30% |
| dipropylene glycol monomethyl ether (vapor pressure: 0.45 mmHg, $\delta_d$ value: 16.0, $\delta_p$ value: 7.0, $\delta_h$ value: 10.6) | 22% |
| 3-methoxy-3-methyl-1-butanol (vapor pressure: 0.50 mmHg, $\delta_d$ value: 16.0, $\delta_p$ value: 5.1, $\delta_h$ value: 12.3) | 15% |
| Ester derivative of polyhydric alcohol: | |
| diglycerin monostearate (HLB = 6.5) | 20% |

An ink composition was obtained by compounding as described above.

The ink composition thus obtained was intended for a stamp ink and charged into a felt for a stamp to prepare a stamp ink pad.

Comparative Example 6

| | |
|---|---|
| Colorant: oil soluble dye (same as in Example 1) | 7% |
| Resin: Ketone Resin (same as in Example 1) | 3% |
| Solvent: hexylene glycol (vapor pressure: 0.02 mmHg, $\delta_d$ value: 15.7, $\delta_p$ value: 8.4, $\delta_h$ value: 17.8) | 88% |
| Ester derivative of polyhydric alcohol: | |
| polyoxyethylene nonylphenyl ether | 2% |

An ink composition was obtained by compounding as described above.

The ink composition thus obtained was intended for a stamp ink and charged into a felt for a stamp to prepare a stamp ink pad.

Comparative Example 7

| Colorant: oil soluble dye (same as in Example 1) | 8% |
|---|---|
| Resin: polyvinylbutyral (same as in Example 2) | 5% |
| Solvent: propylene glycol monobutyl ether (vapor pressure: 0.60 mmHg, $\delta_d$ value: 14.9, $\delta_p$ value: 2.4, $\delta_h$ value: 10.7) | 35% |
| dipropylene glycol monomethyl ether (vapor pressure: 0.45 mmHg, $\delta_d$ value: 16.0, $\delta_p$ value: 7.0, $\delta_h$ value: 10.6) | 20% |
| 3-methoxy-3-methyl-1-butanol (vapor pressure: 0.50 mmHg, $\delta_d$ value: 16.0, $\delta_p$ value: 5.1, $\delta_h$ value: 12.3) | 30% |
| Ester derivative of polyhydric alcohol: decaglycerin monooleate (HLB = 20) | 2% |

An ink composition was obtained by compounding as described above.

The ink composition thus obtained was intended for a stamp ink and charged into a felt for a stamp to prepare a stamp ink pad.

Comparative Example 8

| Colorant: oil soluble dye (same as in Example 1) | 8% |
|---|---|
| Resin: Ketone Resin (same as in Example 1) | 3% |
| Solvent: hexylene glycol (vapor pressure: 0.02 mmHg, $\delta_d$ value: 15.7, $\delta_p$ value: 8.4, $\delta_h$ value: 17.8) | 84% |
| Ester derivative of polyhydric alcohol: diglycerin tetraoleate (HLB = 1.5) | 2% |

An ink composition was obtained by compounding as described above.

The ink composition thus obtained was intended for a stamp ink and charged into a felt for a stamp to prepare a stamp ink pad.

Comparative Example 9

| Colorant: carbon black (same as in Example 7) | 8% |
|---|---|
| Resin: polyvinylbutyral (same as in Example 2) | 5% |
| Solvent: hexylene glycol (vapor pressure: 0.02 mmHg, $\delta_d$ value: 15.7, $\delta_p$ value: 8.4, $\delta_h$ value: 17.8) | 65% |
| 3-methoxy-3-methyl-1-butanol (vapor pressure: 0.50 mmHg, $\delta_d$ value: 16.0, $\delta_p$ value: 5.1, $\delta_h$ value: 12.3) | 24% |

An ink composition was obtained by compounding as described above.

The ink composition thus obtained was intended for a stamp ink and charged into a felt for a stamp to prepare a stamp ink pad.

The ink compositions thus obtained were charged into stamp pads as stamp inks and sealed on PPC paper faces, art paper faces, coated paper faces, glass faces and tracing paper faces to evaluate the drying properties of the print seals thereof, the blurring properties and the drying properties of the pad surfaces. The results thereof are shown in Table 1.

The drying property of the print seals, the blurring property and the drying property of the pad surfaces were evaluated by the following methods.

Evaluation of drying property:

Seals were put on the respective test surfaces shown above to put PPC paper on the print seals one hour later, and a weight of 500 g was loaded thereon. Then, the degree of transferring on PPC paper was functionally evaluated according to the following criteria:

○: not transferred

Δ: slightly transferred

X : heavily transferred

Evaluation of blurring of print seals:

The degrees of blurring of the print seals were functionally evaluated after one day using PPC paper and tracing paper according to the following criteria:

○: no blurring observed on print seal

Δ: blurring observed on print seal

X : heavy blurring observed on print seal

Evaluation of pad surface drying property:

The stamp pads charged with the inks were left for standing for 10 hours in the conditions of a temperature of 25° C. and a humidity of 65% while leaving the covers of the stamp pads opened. Then, seals were put on PPC paper to evaluate the conditions of the print seals.

○: print seals remained the same as in the initial state until the third print seal was put X: blurring phenomenon was caused until the third print seal was put

TABLE 1

| | Example | | | | | | | Comparative Example | | | | | | | | |
|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 |
| Print seal dryability | | | | | | | | | | | | | | | | |
| PPC paper | ○ | ○ | ○ | ○ | ○ | ○ | ○ | ○ | ○ | ○ | ○ | — | ○ | ○ | ○ | ○ |
| Art paper | ○ | ○ | ○ | ○ | ○ | ○ | ○ | X | X | ○ | ○ | — | ○ | ○ | ○ | ○ |

TABLE 1-continued

|  | Example | | | | | | | Comparative Example | | | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 | 8 | 9 |
| Coated paper | ◯ | ◯ | ◯ | ◯ | ◯ | ◯ | ◯ | X | X | ◯ | ◯ | — | ◯ | ◯ | ◯ | ◯ |
| Glass surface | ◯ | ◯ | ◯ | ◯ | ◯ | ◯ | ◯ | X | X | ◯ | ◯ | — | ◯ | ◯ | ◯ | ◯ |
| Tracing paper | ◯ | ◯ | ◯ | ◯ | ◯ | ◯ | ◯ | X | Δ | ◯ | ◯ | — | ◯ | ◯ | ◯ | ◯ |
| Anti-blur of print seal |  |  |  |  |  |  |  |  |  |  |  |  |  |  |  |  |
| PPC paper | ◯ | ◯ | ◯ | ◯ | ◯ | ◯ | ◯ | Δ | Δ | Δ | ◯ | — | ◯ | ◯ | ◯ | ◯ |
| Tracing paper | ◯ | ◯ | ◯ | ◯ | ◯ | ◯ | ◯ | X | X | Δ | ◯ | — | ◯ | ◯ | ◯ | ◯ |
| Anti-drying on pad face | ◯ | ◯ | ◯ | ◯ | ◯ | ◯ | ◯ | ◯ | ◯ | X | X | — | X | Δ | Δ | X |

Remark *: in Comparative Example 5, precipitates were produced at a stage of in preparing the ink composition, and therefore evaluation was impossible.

Example 8

| Colorant: oil soluble dye (same as in Example 4) | 7% |
| --- | --- |
| Resin: Ketone Resin (same as in Example 1) | 2% |
| Solvent: propylene glycol monomethyl ether (vapor pressure: 0.60 mmHg, $\delta_d$ value: 15.6, $\delta_p$ value: 7.2, $\delta_h$ value: 13.6) | 59% |
| ethanol (vapor pressure: 44 mmHg, $\delta_d$ value: 15.8, $\delta_p$ value: 8.8, $\delta_h$ value: 19.4) | 30% |
| Ester derivative of polyhydric alcohol: diglycerin monostearate (HLB = 6.5) | 2% |

An oil base ink composition was obtained by compounding as described above.

The oil base ink composition thus obtained was intended for a marking ink and charged into a fiber bundle to prepare a marking pen.

The marking pen with a cap taken off was left for standing for 5 hours and then used for writing. The pen could write smoothly to obtain fine drawn lines, and blurring was not caused.

Comparative Example 10

| Colorant: oil soluble dye (same as in Example 4) | 7% |
| --- | --- |
| Resin: Ketone Resin (same as in Example 1) | 2% |
| Solvent: propylene glycol monomethyl ether (vapor pressure: 0.60 mmHg, $\delta_d$ value: 15.6, $\delta_p$ value: 7.2, $\delta_h$ value: 13.6) | 61% |
| ethanol (vapor pressure: 44 mmHg, $\delta_d$ value: 15.8, $\delta_p$ value: 8.8, $\delta_h$ value: 19.4) | 30% |

An ink composition was obtained by compounding as described above.

The ink composition thus obtained was intended for a marking ink and charged into a fiber bundle to prepare a marking pen.

The marking pen with a cap taken off was left for standing for 5 hours and then used for writing to find that blurring of the drawn lines was caused.

As explained above in detail, when the oil base ink compositions of the present invention are used for a stamp ink, the print seals put on the hard-absorbing faces of art paper and coated paper have a good drying property, and the distinct print seals are provided as well in sealing on a thin paper face having rough fibrous quality such as tracing paper. Even after leaving the covers of the stamp ink pads in an open state for a long time, the ink adhesion onto a rubber seal face is not changed, and the sealing performance is not damage.

Further, when the oil base ink composition of the present invention is used for a marking ink, leaving the pen with a cap taken off does not cause the ink to be dried and solidified with the volatilization of the solvent, so that the ink flows smoothly out of the pen tip, and the excellent writing performance can be obtained without causing the drawn lines to be blurred.

Further, print seals, drawn lines and records by sealing, writing and printing with stamp ink pads, pens for writing tools and ink jet each using inks containing the oil base ink compositions of the present invention are durable and have a good water resistance.

What is claimed is:

1. An oil base ink composition, comprising:

25 to 95% by weight of at least one solvent selected from the group consisting of alcohols, ethers and esters each having a vapor pressure of 0.005 to 45 mmHg at 20° C. and a dispersion term $\delta_d$ of 13.0 to 20.0, a polar term $\delta_p$ of 1.0 to 10.0 and a hydrogen bond term $\delta_h$ of 5.0 to 20.0 in a Hansen three dimensional dissolution parameter;

0.001 to 10% by weight of a solvent evaporation-inhibiting additive containing an ester derivative of polyhydric alcohol having an HLB falling in a range of 2.0 to 16.0, and selected from the group consisting of polyglycerin higher fatty acid esters, sucrose fatty acid esters and propylene glycol fatty acid esters;

0.001 to 30% by weight of at least one additive selected from the group consisting of a resin which is soluble in said solvent and a surfactant; and 1 to 50% by weight of a colorant.

2. An ink for a stamp comprising the oil base ink composition as described in claim 1.

3. An ink for a writing tool comprising the oil base ink composition as described in claim 1.

4. An ink for ink jet comprising the oil base ink composition as described in claim 1.

5. A stamp ink pad charged with the oil base ink composition as described in claim 1.

6. A pen for a writing tool charged with the oil base ink composition as described in claim 1.

* * * * *